United States Patent [19]

Taylor

[11] 4,261,283
[45] Apr. 14, 1981

[54] DROP MARKER

[76] Inventor: Jeron J. Taylor, 1109 S. Rosser, Glendive, Mont. 59330

[21] Appl. No.: 66,021

[22] Filed: Aug. 13, 1979

[51] Int. Cl.³ .......................... B64D 1/02; G09F 1/04
[52] U.S. Cl. ..................................... 116/209; 40/216; 111/33; 244/138 R
[58] Field of Search ...................... 116/209; 47/73, 74; 111/10, 25, 33; 40/216, 124.1, 539; 244/138 R

[56] References Cited

U.S. PATENT DOCUMENTS

| | | | |
|---|---|---|---|
| 1,615,947 | 2/1927 | Klapka | 40/216 |
| 2,871,596 | 2/1959 | Weiss | 40/216 |
| 3,112,906 | 12/1963 | Zeyher | 244/138 R |
| 3,164,801 | 1/1965 | Nicholl | 116/209 X |
| 3,273,284 | 9/1966 | Anagnostou | 47/74 |
| 3,334,554 | 8/1969 | Adams | 116/63 P |
| 3,374,973 | 3/1968 | Lokerson | 244/138 R |
| 3,428,019 | 2/1969 | Tillay et al. | 116/209 |
| 3,517,449 | 6/1970 | Frandsen et al. | 40/124.1 X |

Primary Examiner—Daniel M. Yasich
Attorney, Agent, or Firm—Thomas W. Secrest

[57] ABSTRACT

This invention is directed to a marker which can be dropped from an aircraft, such as an airplane or a helicopter, so that the pilot of an airplane can see the marker on the ground or on the growing plants and trees, and know, when he is in the aircraft, where the aircraft has flown for spraying fertilizer, insecticides, herbicides and the like. The drop marker comprises a base member which may be unitary or integral. The drop marker upon falling from the aircraft towards the ground is of such a construction that the base member divides in two pieces. The drop marker also comprises a folded streamer strip. One end of the streamer strip is attached to the first piece of the base member and the other end of the streamer strip is attached to the second piece of the base member. The drop marker unfolds upon falling from the aircraft toward the ground. The drop marker, upon reaching the ground and with the streamer strip unfolded, makes it possible for the pilot of the aircraft to know where he has sprayed the chemical carried by the aircraft.

27 Claims, 12 Drawing Figures

DROP MARKER

A BRIEF SUMMARY OF THE INVENTION

This invention is a drop marker and comprises a base member and a streamer strip. The base member may be of unitary construction or may be of integral construction. The base of the drop marker is capable of separating into a first piece and a second piece. One end of the folded streamer strip is attached to the first piece of the base member and the other end of the folded streamer strip is attached to the second piece of the base member.

When the pilot of an aircraft releases a drop marker the drop marker falls to the ground and the base member separates into the first piece and the second piece so as to pull the streamer strip or to unfold and to expand the streamer strip.

With the drop marker lying on the ground or on the area which has been sprayed with chemicals and the two pieces lying on the ground or on the area which has been sprayed chemicals the pilot of the aircraft can see the streamer strip. The streamer strip may be on the ground or may be lying on top of some objects such as growing material like crops and trees. With the pilot of the aircraft being able to see the streamer strip the pilot knows the area which have been sprayed with the chemical from the aircraft and which areas have not been sprayed with the chemical.

The aircraft may be an airplane or a helicopter. In many instances an airplane is used for spraying agricultural products such as corn, soy bean, sorgum, cotton and the like. In other instances a helicopter may be used for spraying chemical. For example, in a forest area a helicopter may be used for spraying fertilizer. In the Pacific Northwest a helicopter is often used for applying fertilizer to timber land. Also, in a small field where it is not practical to use an airplane for applying chemicals a helicopter may be used for applying chemicals to a small field. In the application of the chemicals by an aircraft it is necessary to know where the chemicals have been applied. Therefore, there is used a flag to indicate the demarcation between the area on which the chemical has been applied and the area where the chemical has not been applied. A commonly used flag is a drop marker.

THE DRAWINGS

Figure 7:
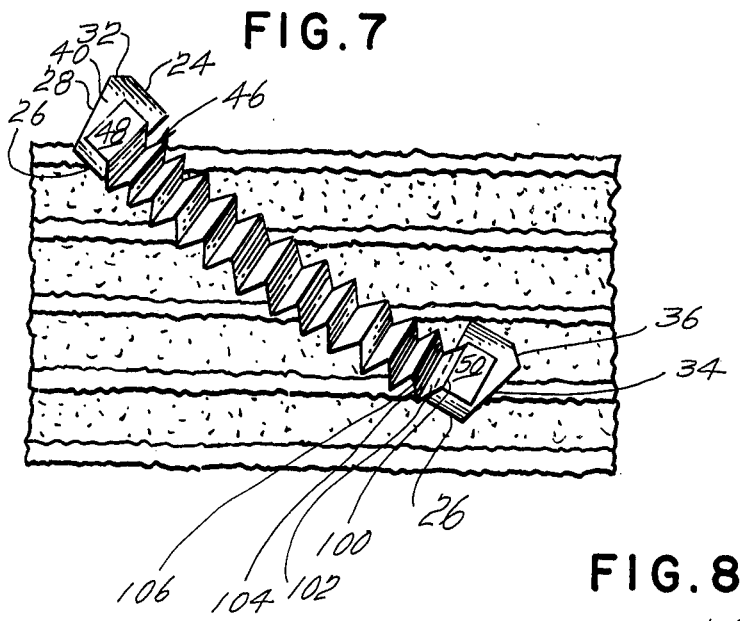
Figure 8:
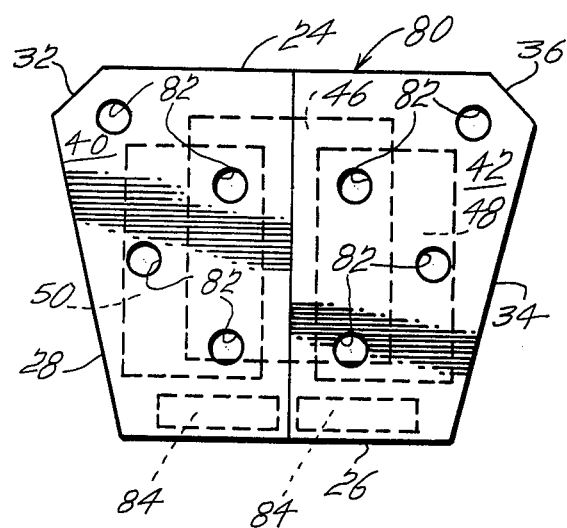
Figure 9:
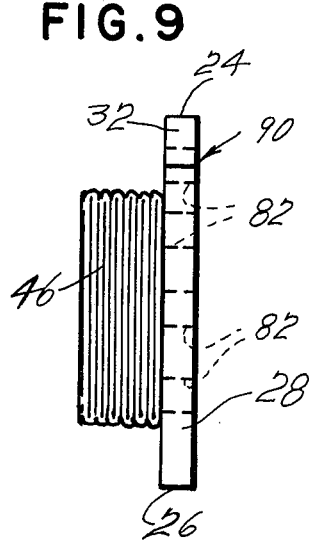
Figure 10:
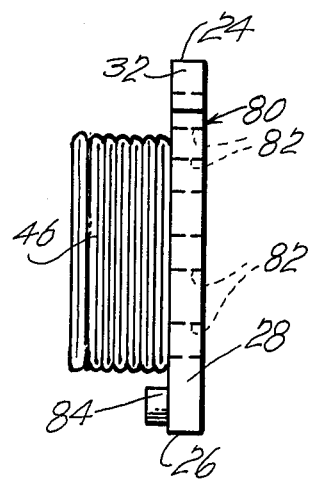
Figure 11:
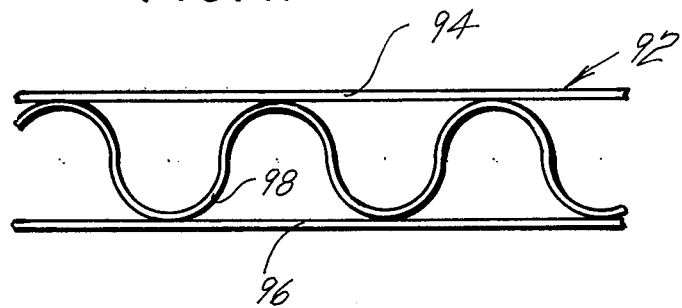
Figure 12:
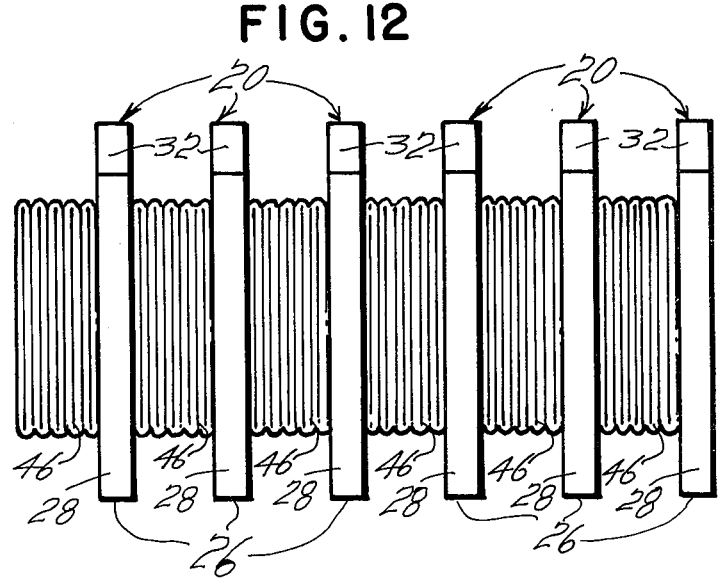

FIG. 7 is a plan view of a field having rows of crops such as corn, sorghum, soy beans, sugar beets or cotton, and with a drop marker lying across some of the rows and wherein the base member of the drop marker has separated into a first piece and a second piece and a folded streamer strip connects between said two pieces and a first end of the streamer strip attached to the first piece and a second end of the streamer strip attached to the second piece;

FIG. 8 is a front view of a modified form of the drop marker and illustrates a number of holes or passageways in the drop marker and, by phantom line, illustrates a folded streamer strip connecting with a first piece of the base member and a second piece of the base member and also illustrates in phantom line a reinforcing plate;

FIG. 9 is a side-elevtional view of a drop marker and illustrates the base memeber having holes or passageways, in phantom lines, and the folded streamer strip;

FIG. 10 is a side-elevational view of a drop marker and illustrates the base member, having holes or passageways, a reinforcing plate and a folded streamer strip;

FIG. 11 is an edge view of a corrugated board and illustrates a first face sheet, a second face sheet and a corrugated sheet between the first face sheet and the second face sheet; and, FIG. 12 is a side-elevational view of a number of drop markers as positioned in a cannister ready for release and dropping to the ground from the aircraft.

THE DETAILED DESCRIPTION OF THE INVENTION

For a number of years, aircrafts have been used for spraying chemicals onto land. For example, the aircraft have been used for spraying fertilizer, insecticides, herbicides and the like on farm land. Also, aircraft have been used for spraying insecticides and herbicides on grazing land and on forest land to control the tussock moth. Further, aircraft have been used for spraying fertilizer on forest land to increase the growth of trees. With the spraying of these chemicals onto the land, it is necessary for the aircraft pilot to know where the chemicals have been sprayed and to know where the chemicals have not been sprayed. To know the demarcation between these two areas, it is necessary to have an indicator. A satisfactory indicator is a drop marker or flag which can be dropped from an aircraft and which has an identifying portion or member which can be seen by the pilot in the aircraft when the drop marker is on the ground or overgrowing crops or hanging from a tree in a forested area.

The drop marker should be, relatively, inexpensive as the drop marker is used, only, once and a large number of drop markers are used by aircraft pilots in the spraying of chemicals onto the farm land, range land and forests.

I have been a pilot who has sprayed chemicals onto farm land and range land. At times it has been difficult to know where the chemicals have previously been sprayed and where the chemicals have not been sprayed. As a crop duster I have flown airplanes in many parts of the country and have flown over various types of terrain such as flat terrain and also hilly terrain such as in the Palouse Hills of Eastern Washington. As a crop dusting pilot I know the value of a drop marker or flag for indicating where I have spread chemicals and where I have not spread chemicals.

In the drawings it is seen that there is a drop marker 20. The drop marker 20 comprises a base member 22 of a, generally, predetermined geometrical shape, such as a trapezoidal configuration. There is a long edge 24 and a short edge 26. A first side 28 connects with the short edge 26 and projects outwardly. Then, a first diagonal 32 connects with the long edge 24 and projects to meet the first side 28. A second side 34 connects with the short side 26 and projects outwardly. A second diagonal 36 connects with the long edge 24 and projects outwardly to meet with the second side 34.

In the central part of the base member 22 there is a series of perforations or slits 38 running from the longer edge 24 to the shorter edge 26. The perforations or slits 38 define the base member as a first piece 40 and a second piece 42. The reader is to understand that at this stage the base member 22 is of unitary construction and that the first piece 40 and the second piece 42 are in a coplanar configuration.

Figure 1:
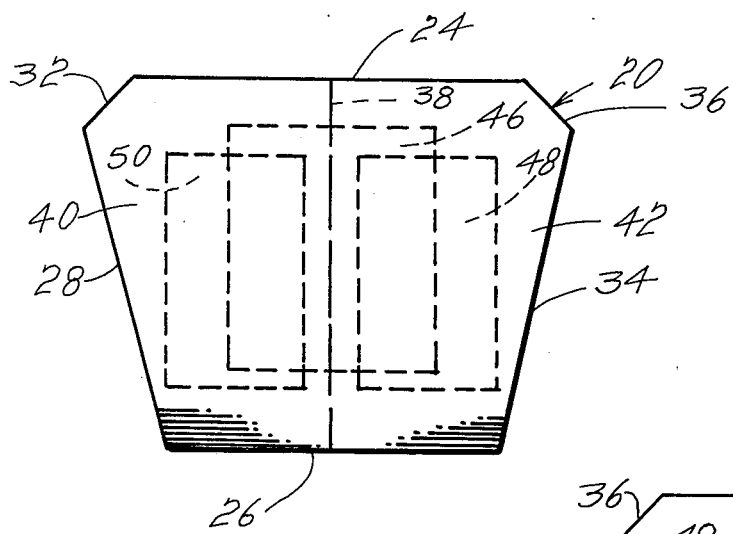
FIG. 1 is a front view of a drop marker illustrating a unitary base member which has a perforated line for dividing the unitary base member into a first piece and a second piece, and also, in phantom lines, illustrates a folded streamer strip with a first end of the streamer strip affixed to the first piece and the second end of the streamer strip affixed to the second piece.
Figure 2:
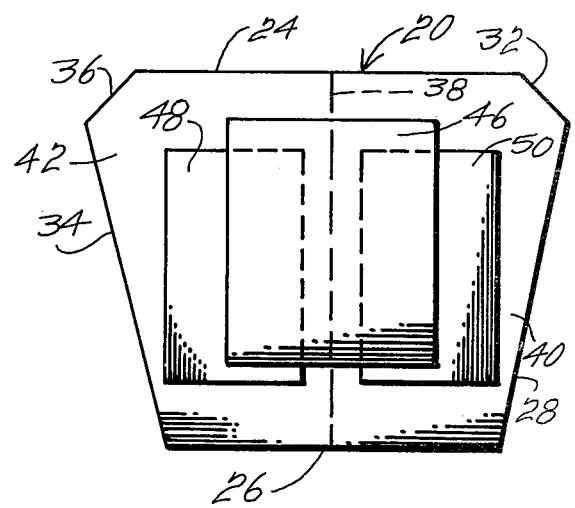
FIG. 2 is a rear view of the drop marker of FIG. 1.
Figure 3:
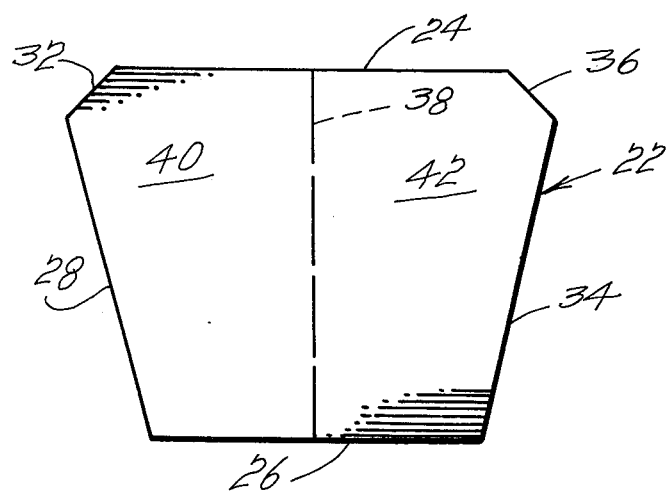
FIG. 3 is a view of a unitary base member showing a perforated line to define a first piece and a second piece.

There is a folded streamer strip 46 having a first end 48 and a second end 50. The first end 48 is affixed to the first piece 40 and the second end 50 is affixed to the second piece 42. In the drawings, FIGS. 1 and 2, it is seen that the folded streamer strip 46 is a connecting means between the first piece 40 and the second piece 42.

Figure 4:
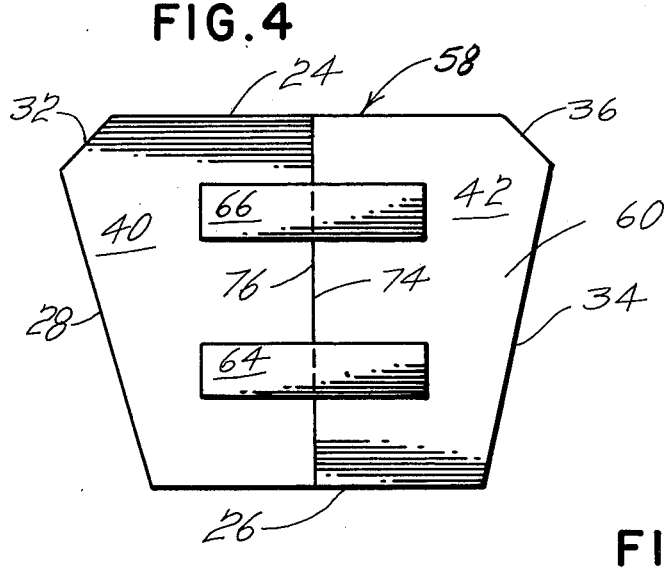
FIG. 4 is a view of an integral base member and illustrates two separate pieces, a first piece and a second piece, joined by a connecting means, two narrow strips, and the first piece and the second piece are in a coplanar relationship.
Figure 5:
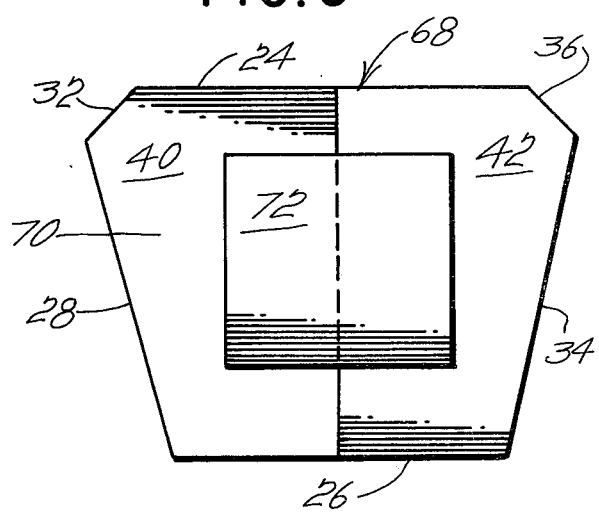
FIG. 5 is a view of an integral base member having a first piece and a second piece and a connecting means, a wide strip, connecting the first piece and the second piece with the first piece and the second piece being in a coplanar relationship.

In FIGS. 4 and 5 there is illustrated another species of the drop marker.

In FIG. 4 there is illustrated the drop marker 58 having a base member 60. The base member 60 has the edges 24 and 26, the sides 28 and 34, the diagonals 32 and 36. Further, there is a dividing line. The dividing line divides the base member 60 into the first piece 40 and the second piece 42. It is to be clearly understood that the dividing line separates the base member 60 into two separate and distinct pieces. There are fragile connecting strips 64 and 66 for uniting the first piece 40 and the second piece 42 into an integral base member 60. The fragile connecting strip 64 may be made of the same material as the folded streamer strip 46. The fragile connecting strips 64 and 66, upon the drop marker 58 being droppesd from the aircraft, must be of such a construction that the base member 60 will separate into the first piece 40 and the second piece 42 so as to spread the streamer strip 46 for marking purposes.

In FIG. 5 there is illustrated a drop marker 68 having a base member 70. The base member 70 has the edges 24 and 26, the sides 28 and 34, the diagonals 32 and 36. Again, there is a dividing line 62 for dividing the base member 70 into a first piece 40 and the second piece 42. There is a fragile connecting strip 72 connecting together the two pieces 40 and 42 so that they are in a side-by-side relationship and also in a coplanar configuration. The fragile connecting strip 72 may be of the same material as the folded streamer strip 46. The fragile connecting strip 72 must be of such construction and affixed to the first piece 40 and second piece 42, similarly, to the fragile connecting strips 64 and 66 which are of such construction and so affixed to the first piece 40 and second piece 42, that the base member 70 of the drop marker 68, as well as the base member 60 of the drop marker 58, upon being dropped from an aircraft and falling toward the ground will separate into the two pieces 40 and 42 so as to expand and unfold the folded streamer strip 46 for marking and identification purposes.

The base members may be considered to have a first-inner side 74 on the first piece 40 and a second-inner side 76 on the second piece 42. This is especially so with the base member 60 of the drop marker 58 and the base member 70 of the drop marker 68 when the base member is of an integral construction as well as when the base member is separated into two pieces. In regard to the drop marker 20 the first-inner side 74 and the second inner-side 76 occur when the drop marker 20 is falling from the aircraft toward the ground and the base member separates, while in flight, into the first piece 40 and the second piece 42.

Figure 6:
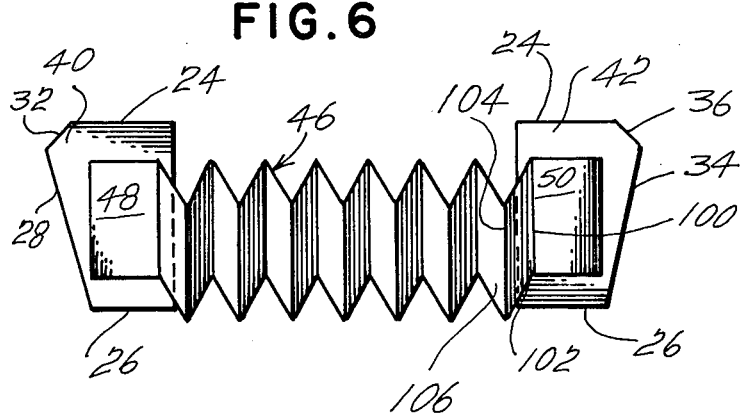
FIG. 6 is a view of a drop marker and illustrates the base member in two pieces, a first piece and a second piece, and with a streamer strip in an expanded state having a first end affixed to the first piece and a second end affixed to the second piece.

In FIG. 6 there is illustrated a drop marker, such as 20, 58 or 68 which has separated into the first piece 40 and the second piece 42. The first end 48 of the streamer strip is affixed to the first piece 40 and the second end 50 of the streamer strip is affixed to the second piece 42. The streamer strip 46, it is seen in FIG. 6, bridges the gap between the first piece 40 and the second piece 42.

In FIG. 7 there is illustrated a drop marker bridging rows of crops, such as corn, sorghum, soy beans and cotton, to name a few, in a field to flag or identify that part of the field which has received chemicals from an aircraft from that part of the field which has not received chemicls from an aircrat.

In FIGS. 8, 9 and 10 there is illustrated another species of the drop marker.

In FIGS. 8 and 10 there is illustrated a drop marker 80 having holes or passageways 82 in the base member and in the first piece 40 and the second piece 42. It is seen that the end of the streamer strip covers some of the holes or passageways 82 and do not cover some of the holes or passageways 82. Further, there is a reinforcing plate 84 near the shorter edge 26. With the reinforcing plate 84 there is an unbalance in the base member and also in the first piece 40 and the second piece 42 so as to assist in causing a tumbling action and to assist in separating the base member into the two pieces when the drop marker is falling from the aircraft toward the ground.

In FIG. 9 there is illustrated a drop marker 90, similar in construction to the drop marker 80, but which drop marker does not have reinforcing plates 84. The drop marker 90 does have the passageways or holes 83. Again, some of these passageways or holes 82 are covered by an end of the streamer strip and other holes or passageways 82 are not covered by an end of the streamer strip.

The drop markers 80 and 90 have edges 24 and 26, sides 28 and 34, diagonals 32 and 36, and inner sides 74 and 76.

The material of construction of the base member may be paper board or it may be corrugated board.

In FIG. 11 there is illustrated corrugated board 92. The corrugated board 92 has a first face sheet 94, a second face sheet 96 and a corrugated sheet 98 contacting with and connecting with the face sheets 94 and 96. Again, paper board or currugated board or other suitable material may be used as the base member.

In FIG. 12 there is illustrated a number of drop markers such as 20, 58, 68, 80 and 90 as positioned one against the other. This is a position of the drop markers in a cannister waiting to be dispensed from the cannister and from the aircraft so as to fall from the aircraft towards the ground.

As stated previously the base member of the drop marker may be made of flexible corrugated board or paper board. Flexible corrugated board is well known and is used in packing houses. Paper board is also well known and is known as cardboard. Paper board is compressed paper and is readily found in the back of tablets as a reinforcing material for paper tablets and also the writing base for paper tablets. Paper board is also used in the making of guitar cases. In FIG. 7 there is illustrated the drop marker spread across rows of crops. These crops may be four, five or six feet in height of corn, sorghum which may be five, six or seven feet in height, sun flowers which may be four, five, six or seven feet in height and, even, trees. It is seen that the drop marker bridges these tall crops. The pilot of the aircraft has sprayed the area with chemicals such as insecticides, herbicides, fertilizer and the like. The expanded and unfolded drop marker indicates to the pilot of the aircraft where he has sprayed.

The streamer strip 46 may be of a suitable material such as thin paper or tissure paper or a like paper, which is biogradable material.

It is possible to make the base members and the streamer strip of various materials such as plastic or a fibrous material. A desorable fibrous material is cellulose which is, commonly, available. The streamer strip may be commercial tissue paper of a quality and thickness similar to facial tissue. It is desirable that the base members and the streamer strip disintegrate upon being exposed to the elements, such as water, sunshine, wind, and the action of bacteria in the earth. Therefore, it is desirable that the drop marker be made of cellulose fibers which are, readily, available from wood. The adhesive for bonding together the base pleats of the streamer strip to the base members of the drop marker may be an urea based adhesive. Such an adhesive also functions as a fertilizer with the disintegration of the drop marker.

In FIG. 6 it is seen that there is attached to a base member one end of the drop marker 46 or a base pleat 48 or 50. There is a fold 100 between the end 48 or 50 of the streamer and the first free pleat 102. Then, there is a fold 104 between the first free pleat 102 and the second free pleat 106. This continues with the streamer strip. The end 48 or 50 of the streamer strip may be affixed to the base member by an adhesive such as an urea based adhesive.

From the foregoing it is seen that I have provided a drop marker which can be dropped from an aircraft and the drop marker upon landing on growing crops or on the ground or being hung up in a tree can be visually seen by the aircraft pilot while the pilot is flying the aircraft. Also, the drop marker of this invention is inexpensive to manufacture and to package for dropping from an aircraft. To repeat, the drop marker is used once. Therefore, it is desirable that the drop marker be inexpensive to manufacture and be inexpensive to handle. Further, the drop marker of this invention can be used with existing ejection equipment provided for other drop markers and, in particular, the ejection equipment of U.S. Pat. No. 3,470,846, issuing date of Oct. 7, 1969 to D. Tillay et al. In addition, the drop marker of this invention will disintegrate upon being exposed to the elements such as water, air, sun, wind and the bacterial action in the earth and also in the crops. Finally, the drop marker of this invention does not become a pollutant as it does disintegrate and if, made from cellulose fibers, can be recycled into the chemical and physical processes of the earth.

In preparing this patent application I did not make a patent search. However, as I have stated previously, I have flown airplanes as a crop duster and am familiar with the state of the art. Therefore, I know the following patents and consider that the subject invention distinguishes over these patents:

| U.S. PAT. NO.: | INVENTOR: | DATE ISSUED: |
| --- | --- | --- |
| 1,564,152 | J. M. THOMSON | 12/1/25 |
| 1,798,052 | F. ADDITION | 3/24/31 |
| 1,805,002 | F. NEUMEYER | 5/12/31 |
| 1,985,678 | L. T. HAND | 12/25/34 |
| 2,149,530 | L. LOWETH | 3/7/39 |
| 2,183,540 | D. H. CAMPBELL | 12/19/39 |
| 2,134,987 | N. N. SHORB | 11/1/38 |
| 2,238,875 | F. G. MANSON | 4/15/41 |
| 2,349,984 | R. K. OSTRANDER | 5/30/44 |
| 2,360,516 | G. T. SCHMIDLING | 10/17/44 |
| 2,474,523 | GUYER | 6/1949 |
| 2,589,045 | BROOKS | 3/1952 |
| 2,610,868 | M. FLAMENT | 9/1952 |
| 2,646,786 | ROBERTSON | 7/1953 |
| 2,800,099 | BAKER | 7/1957 |
| 2,825,803 | L. NEWBROUGH | 3/4/58 |
| 2,949,094 | F. H. CLOTHIER | 8/16/60 |
| 3,059,362 | J. SCHEROTTO | 10/23/62 |
| 3,081,907 | SCERBO | 3/1963 |
| 3,094,266 | HOFF | 6/1963 |
| 3,164,801 | NICHOLL | 1/1965 |
| 3,199,764 | OLIVER | 8/1965 |
| 3,280,549 | JUI-CHENG HSU | 10/25/66 |
| 3,322,093 | GOLAND et al | 5/1967 |
| 3,360,728 | STEVINSON et al | 12/1967 |
| 3,428,019 | D. TILLAY et al | 2/18/69 |
| 3,470,846 | D. TILLAY et al | 10/7/69 |
| 3,885,729 | ROUS | 5/1975 |
| 3,973,513 | HUWE | 8/10/76 |

From the foregoing and having presented my invention, what I claim is:

1. A drop marker for use in marking ground areas from an airplane, said drop marker comprising:
   a. a base member of a predetermined geometrical configuration;
   b. said base member being capable of separating into a first distinct piece and a second distinct piece;
   c. a folded streamer strip of soft flexible material having a large surface area and a first end and a second end;
   d. said first end being affixed to said first piece;
   e. said second end being affixed to said second piece; and,
   f. whereby when the drop marker is dropped from an airplane said base member separates into said first piece and said second piece thereby causing said folded streamer strip to unfold and stream between said first piece and said second piece.

2. A drop marker according claim 1 comprising:
   a. said base member having holes.

3. A drop marker according to claim 2 comprising:
   a. wherein said streamer strip overlies some of the holes.

4. A drop marker accroding to claim 1 comprising:
   a. said folded streamer strip lying wholly within the border of the base member to provide exposed edge portions on said base member and thereby facilitate separation of one marker from a plurality of markers.

5. A drop marker according to claim 1 comprising:

a. wherein the base member and the streamer strip are all composed of biodegradable material.

6. A drop marker according to claim 5 comprising:
a. wherein the biodegradable material comprises vegetable fibers.

7. A drop marker according to claim 1 comprising:
a. a reinforcing plate attached to said base member near an exposed edge to stiffen said base member at said portion to cause an unbalance in the weight distribution of said base member.

8. A drop marker according to claim 1 comprising:
a. said base member having holes;
b. a reinforcing plate attached to said base member near an exposed edge to stiffen said base member at said portion to cause an unbalance in the weight distribution of said base member;
c. said folded streamer strip lying wholly within the border of the base member to provide exposed edge portions on said base member and thereby facilitate separation of one marker from a plurality of markers;
d. wherein the base member and the streamer strip are all composed of biodegradable material;
e. wherein the biodegradable material comprises vegetable fibers; and,
f. wherein said streamer strip overlies some of the holes.

9. A drop marker according to claim 1 comprising:
a. said base member being of unitary construction; and,
b. a means associated with said base member to define said first piece and said second piece.

10. A drop marker according to claim 9 comprising:
a. said means being perforations in said base member to permit said base member to separate into said first piece and said second piece.

11. A drop marker according to claim 9 comprising:
a. said base member having holes.

12. A drop marker according to claim 11 comprising:
a. wherein said streamer strip overlies some of the holes.

13. A drop marker according to claim 9 comprising:
a. said folded streamer strip lying wholly within the border of the base member to provide exposed edge portions on said base member and thereby facilitate separation of one marker from a plurality of markers.

14. A drop marker according to claim 9 comprising:
a. wherein the base member and the streamer strip are all composed of biodegradable material.

15. A drop marker according to claim 14 comprising:
a. wherein the biodegradable material comprises vegetable fibers.

16. A drop marker according to claim 9 comprising:
a. a reinforcing plate attached to said base member near an exposed edge to stiffen said base member at said portion to cause an unbalance in the weight distribution of said base member.

17. A drop marker according to claim 9 comprising:
a. said base member having holes;
b. a reinforcing plate attached to said base member near an exposed edge to stiffen said base member at said portion to cause an unbalance in the weight distribution of said base member;
c. said folded streamer strip lying wholly within the border of the base member to provide exposed edge portions on said base member and thereby facilitate separation of one marker from a plurality of markers;
d. wherein the base member and the streamer strip are all composed of biodegradable material;
e. wherein the biodegradable material comprises vegetable fibers; and,
f. wherein said streamer strip overlies some of the holes 18. A drop marker according to claim 1 comprising:
a. said base member being of integral construction;
b. said base member comprising said first piece and said second piece;
c. a means of connecting together said first piece and said second piece; and,
d. said first piece and said second piece being in a side-by-side coplanar configuration.

19. A drop marker according to claim 18 comprising:
a. said base member having holes;
b. a reinforcing plate attached to said base member near an exposed edge to stiffen said base member at said portion exposed edge to stiffen said base member at said portion to cause an unbalance in the weight distribution of said base member;
c. said folded streamer strip lying wholly within the border of the base member to provide exposed edge portions on said base member and thereby facilitate separation of one marker from a plurality of markers;
d. wherein the base member and the streamer strip are all composed of biodegradable material;
e. wherein the biodegradable material comprises vegetable fibers; and,
f. wherein said streamer strip overlies some of the holes.

20. A drop marker according to claim 18 comprising:
a. said means being perforations in said base member to permit said base member to separate into said first piece and said second piece.

21. A drop marker according to claim 18 comprising:
a. said base member having holes.

22. A drop marker according to claim 21 comprising:
a. wherein said streamer strip overlies some of the holes.

23. A drop marker according to claim 18 comprising:
a. said folded streamer strip lying wholly within the border of the base member to provide exposed edge portions on said base member and thereby facilitate separation of one marker from a plurality of markers.

24. A drop marker according to claim 18 comprising:
a. said means comprising a connecting strip.

25. A drop marker according to claim 18 comprising:
a. a reinforcing plate attached to said base member near an exposed edge to stiffen said base member at said portion to cause an unbalance in the weight distribution of said base member.

26. A drop marker according to claim 18 comprising:
a. wherein the base member and the streamer strip are all composed of biodegradable material.

27. A drop marker according to claim 26 comprising:
a. wherein the biodegradable material comprises vegetable fibers.

* * * * *